United States Patent [19]

Niccum et al.

[11] Patent Number: 4,514,285
[45] Date of Patent: Apr. 30, 1985

[54] CATALYTIC CRACKING SYSTEM

[75] Inventors: Phillip K. Niccum; Dorrance P. Bunn, Jr., both of Houston, Tex.

[73] Assignee: Texaco Inc., White Plains, N.Y.

[21] Appl. No.: 478,018

[22] Filed: Mar. 23, 1983

[51] Int. Cl.³ .................. C10G 11/14; F27B 15/08
[52] U.S. Cl. .................. 208/148; 208/161; 208/164; 422/144
[58] Field of Search .......... 208/113, 120, 164, 146, 208/148, 161

[56] References Cited

U.S. PATENT DOCUMENTS

| 2,701,785 | 2/1955 | Lechthaler | 208/120 |
|---|---|---|---|
| 2,785,110 | 3/1957 | Leffer | 208/148 |
| 3,074,878 | 1/1963 | Pappas | 208/127 |
| 3,259,565 | 7/1966 | Kimberlin, Jr. | 208/148 |
| 3,565,790 | 2/1971 | Schwarzenbek | 208/153 |
| 3,679,576 | 7/1972 | McDonald | 208/74 |
| 3,835,029 | 9/1974 | Larson | 208/113 |
| 4,385,985 | 5/1983 | Gross et al. | 208/113 |

Primary Examiner—Delbert E. Gantz
Assistant Examiner—O. Chaudhuri
Attorney, Agent, or Firm—Robert A. Kulason; James F. Young; James J. O'Loughlin

[57] ABSTRACT

A fluid catalytic hydrocarbon conversion process and apparatus in which hot freshly regenerated catalyst is contacted with hydrocarbon feedstock in a gravity flow catalytic reactor. Spent catalyst from the reactor is separated from reactants in a ballistic separator and completely regenerated in a riser regenerator.

5 Claims, 3 Drawing Figures

CATALYTIC CRACKING SYSTEM

This invention relates to a fluid catalytic conversion process and apparatus in which a hydrocarbon conversion is carried out in a concurrent flow reaction zone into which undiluted hot freshly regenerated catalyst is fed by gravity. In one of its more specific aspects, the invention relates to an improved process and apparatus for cracking a hydrocarbon feedstock under controlled, readily variable reaction conditions.

In the process and apparatus of this invention, catalyst in particle form suitable for use in a fluid catalyst conversion system is fed into the upper end of a gravity-assisted downwardly directed reaction zone into which the hydrocarbon feed stream may be injected at one or more points along the path of flow of the catalyst. The effluent from the reaction zone is discharged downwardly and axially into an unobstructed separation zone wherein catalyst is separated from hydrocarbon vapors. The separated catalyst, referred to herein as spent catalyst, is then subjected to stripping with a suitable stripping medium in the stripping zone. A portion of the stripping zone is maintained at a higher temperature than the reactor outlet temperature by circulation of hot regenerated catalyst to the stripper. Following stripping, the spent catalyst is regenerated with an oxygen-containing gas in an upflow riser regeneration zone terminating in a downwardly directed outlet which discharges the regenerated catalyst into a separator from which it may be recirculated to the reaction zone and to the stripping zone.

A novel catalyst separation method is employed for separation of spent catalyst from products of reaction and for separation of regenerated catalyst from flue gases. The separation method, referred to herein as a ballistic system is one in which the momentum of the catalyst particles assisted by gravity is utilized to effect separation of catalyst from reaction products or flue gases without the need for complex equipment. The process of this invention will be described in detail with reference to a fluid catalytic cracking system. Both the process steps and the apparatus may be applied to other hydrocarbon conversion processes.

In a typical conventional fluidized catalytic cracking process, a hydrocarbon oil feedstock is contacted with a particulate hydrocarbon conversion catalyst in a reaction zone under conditions such that the hydrocarbon feedstock is converted into desired products of lower molecular weight accompanied by the production of hydrogen and other gaseous by-products and the depositions of coke on the surface of the catalyst particles. Such systems may comprise one or more riser reactors, or transport type reaction zones, through which vaporized hydrocarbons and solid particulate catalyst suspended in or carried by the hydrocarbon vapors, optionally mixed with steam, are passed. Reaction products and catalyst are discharged from the transport type reaction zone into a separation zone in which hydrocarbon vapors are separated from the catalyst. During its passage through the reaction zone, the catalyst becomes partially deactivated due to the deposition of coke on the surface of the catalyst. This partially deactivated catalyst is commonly referred to as "spent" catalyst as contrasted with "regenerated" catalyst. Spent catalyst is regenerated by combustion of coke deposits therefrom by means of an oxygen-containing gas.

Regeneration of spent cracking catalyst is effected, after separation of the spent catalyst from reaction products discharged from the reaction zone, by first contacting the spent catalyst in a stripping zone with a stripping medium, usually steam, to remove vaporizable entrained and occluded hydrocarbons from the catalyst. From the stripping zone, stripped catalyst is passed into a regeneration zone wherein the stripped spent catalyst is regenerated by burning coke deposits therefrom with an oxygen-containing gas, usually air. The resulting hot regenerated catalyst from the regeneration zone is then recycled to the reaction zone into contact with additional hydrocarbon feedstock.

The yield of desirable products from a given hydrocarbon charge to a fluidized catalytic cracking process may be controlled within certain limits by selection of the catalyst; the hydrocarbon conversion conditions within the reaction zone, i.e., the temperature, pressure and contact time; and the catalyst-to-oil ratio best suited for processing a particular charge stock.

It is known in the prior art from U.S. Pat. No. 3,835,029, for example, to contact hydrocarbon reactants and catalyst in a concurrent downflow reaction zone in which particulate solid catalyst suspended in steam is contacted with a hydrocarbon feedstock to effect short contact time high temperature catalytic cracking for the production of light olefins. The process of this invention is an improvement over the known prior art in providing a novel method and apparatus for controlled contact between a conversion catalyst and a hydrocarbon feedstock in a downflow reactor.

The process of this invention provides a method for producing improved yields of higher octane motor fuel blending stocks, from hydrocarbon oil feedstocks, better catalyst utilization, lower utilities requirements, reduced investment costs, and enhanced flexibility, safety and environmental protection as compared with conventional fluid catalytic cracking systems.

The method and apparatus of this invention provides flexibility with respect to hydrocarbon feedstock composition, product distribution, and plant throughput capacity. Further features and advantages of the process and apparatus of this invention will be apparent from a detailed description of a preferred embodiment of the process and apparatus of this invention as applied to catalytic cracking of hydrocarbons.

Figure 1:
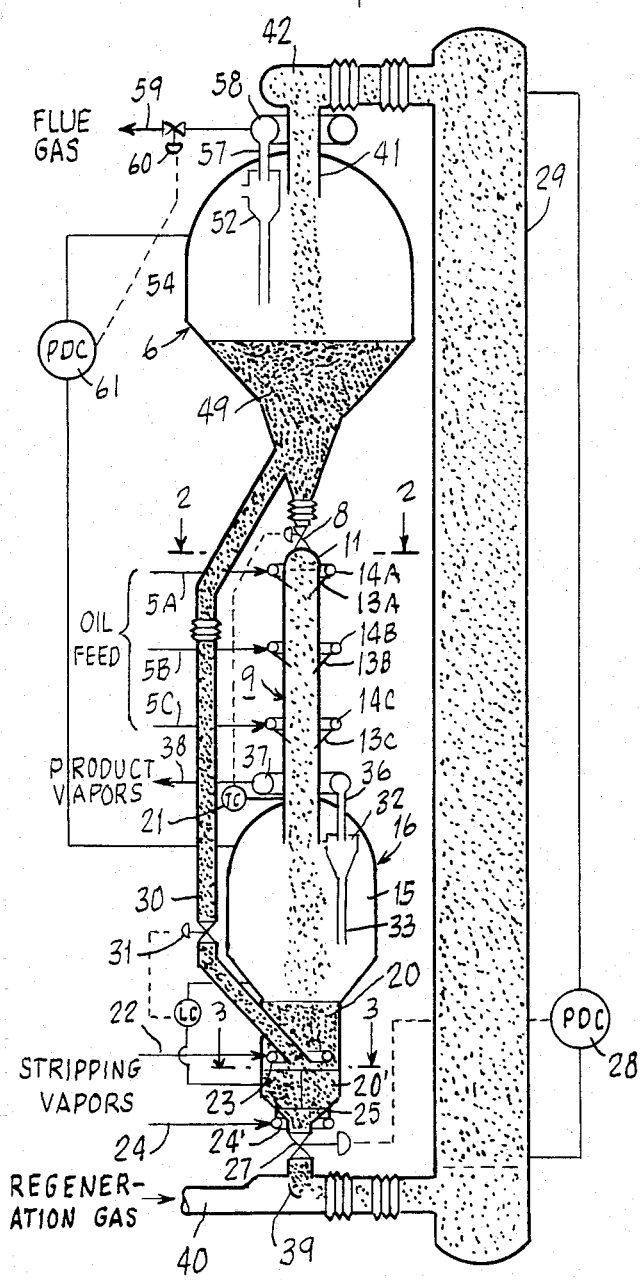
FIG. 1 is a diagrammatic representation of a preferred form of apparatus of the present invention which is suitable for carrying out the process of this invention.
Figure 2:
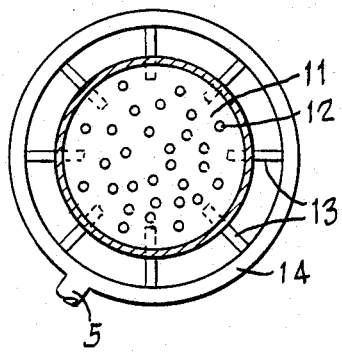
FIG. 2 is a cross-sectional view taken along the line 2—2 of FIG. 1.

With reference to FIG. 1 of the drawings illustrating a preferred embodiment of the catalytic cracking system of this invention, the system comprises a ballistic catalytic reactor 9, spent catalyst separator 15, catalyst stripper 20, regenerator 29, and regenerated catalyst separator 6. In operation, freshly regenerated catalyst is withdrawn directly from the bottom of regenerated catalyst separator vessel 6 undiluted with steam or other carrier gas through valve 8 and introduced into the upper end of reactor 9. Hydrocarbon feedstocks are supplied to the reactor through any or all of lines 5A, 5B, and 5C. A catalyst distributor plate 11 provided with apertures 12 at the upper end of reactor 9 ensures even distribution of catalyst to the reactor. The oil feed from line 5A, 5B or 5C is injected into the reaction zone 9 through downwardly directed injection nozzles 13A, 13B, 13C, from annular distributor rings 14A, 14B, 14C as shown in greater detail in FIG. 2. The oil feed introduced through nozzles 13 vaporizes when contacted with the catalyst and flows downward through the reaction zone 9 in contact with the falling catalyst.

Catalyst leaving the reaction zone 9 travels downward through ballistic separator 15 in vessel 16 aided by the influence of gravity so that a separation of catalyst from product vapors takes place. Separated spent catalyst accumulates in the lower part of vessel 16 which comprises a two stage fluidized bed catalyst stripping zone. Products of reaction are withdrawn through cyclone separators 32 having an inlet at substantially the same level in vessel 16 as the discharge end of reactor conduit 9 such that product vapors flow horizontally away from the catalyst with substantially no net vertical vapor flow in spent catalyst separation zone 15.

Conversion of the oil feed to desired products takes place in reactor 9 under controlled conditions of temperature, pressure and contact time. Catalyst is separated from the hot reaction products immediately upon discharge from the reaction zone to assist in control of the extent of reaction taking place in the reactor and associated separation equipment. The desired reaction temperature within the dilute phase downflow reactor 9 is obtained by temperature control means 21 responsive to the temperature therein to adjust valve 8 and thereby regulate the amount of hot regenerated catalyst admitted to the reactor 9. At any feed rate, control of the rate at which regenerated catalyst enters the reactor 9 effectively maintains the desired reaction temperature in the reactor.

As illustrated in FIG. 1 of the drawings, reaction products and catalyst are discharged from the vertical downflow reaction zone 9 axially into the upper part of separation zone 15 which comprises the enlarged upper portion of vessel 10. The cross-sectional area of the separation zone portion of vessel 16 is very large as compared with the cross-sectional area of reaction 9. Upon discharge from the reaction zone, catalyst is immediately separated from the reaction products and travels downward through the unobstructed separation zone section of vessel 16 due to its inertia assisted by gravity. The reaction products flow horizontally away from the catalyst to cyclone separators 32 while the separated catalyst falls directly into a dense phase fluidized bed of catalyst in catalyst stripping zone 20 in the lower part of vessel 16.

Figure 3:
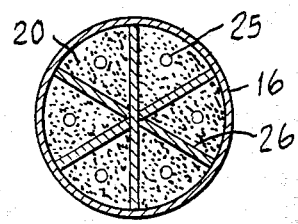
FIG. 3 is a cross-sectional view taken along the line 3—3 of FIG. 1.

Catalyst separated from the reaction products in ballistic separator 15 falls into a dense phase fluidized bed of catalyst in the upper or first stage 20 of a catalyst stripping zone in the lower portion of vessel 16. Stripping medium, suitably steam, from line 22 is introduced into a distributor ring 23 in the mid section of the stripping zone, stripping hydrocarbons from spent catalyst in the upper or first zone 20 of the stripper. Additional stripping medium is introduced into the second stage or lower portion 20' of the catalyst stripper from line 24 through distributor ring 24' and nozzles 25. Vertical baffles 26, suitably arranged to divide the second stage 20' of catalyst stripper into pie segments as illustrated in FIG. 3, provide intimate contact between stripping medium and catalyst in the second stage 20' of the stripper.

Some of the hot regenerated catalyst in separator 6 is withdrawn through line 30, at a rate governed by level control valve 31, and introduced into the second stage 20' of the stripping section of vessel 16 raising its temperature to a temperature higher than that in the first stage causing some coke decomposition to occur in the second stage 20'. Stripping medium introduced through line 24 carries products of coke decomposition into the upper, first stage 20 of the stripper wherein occluded and entrained hydrocarbons are removed from the catalyst. Stripping gas and hydrocarbon vapors pass upwardly into the upper portion of vessel 16.

Spent catalyst which has been stripped in the stripping sections 20 and 20' of vessel 16, passes downwardly through catalyst valve 27 into the inlet of dilute phase entrained catalyst riser regenerator 29. The opening of valve 27 is controlled by a differential pressure regulator 28 which adjusts the valve 27 to maintain a specified inventory of catalyst in the riser regenerator 29.

Vaporous products of reaction from the downflow reaction zone 9, after gravity separation from spent catalyst in separator section 15 of vessel 16, and in admixture with steam and hydrocarbon vapors from stripping section 20, enter cyclone 32 where entrained catalyst particles are recovered from the mixture of hydrocarbon vapors and steam. Recovered catalyst is returned to the first stage 20 of the stripper through dipleg 33. Although only one single stage cyclone is illustrated in the figure, it will be understood that several cyclones may be assembled to achieve substantially complete separation of fine particles of catalyst from the mixture of hydrocarbon vapors and steam and to handle the large volume of vapor which is present in this part of the process. Effluent vapors pass from cyclone 32 through line 36 into plenum ring 37 and are discharged through line 38.

Spent catalyst leaving the stripper 20 through valve 27 is deflected by baffle 39 into a stream of regeneration air introduced through line 40. The stripped spent catalyst is entrained in the air and transported upwardly through a disperse phase vertical riser type catalyst regeneration zone 29. Air and combustion products resulting from burning of accumulated coke from the spent catalyst carry the catalyst upwardly through riser regenerator 29 to separator vessel 6. Coke is substantially completely burned from the catalyst in the riser regenerator 29. Regenerated catalyst admixed with nitrogen and carbon dioxide from the regeneration zone 29 is discharged ballistically through a downwardly directed discharge line 41 into separator vessel 6. Regenerated catalyst separated from the flue gases is accumulated in the lower part 49 of the ballistic separator vessel 6. Transfer line 42 carries the regenerated catalyst and associated gases from riser regenerator 29 to discharge line 41.

Regeneration air introduced into riser regenerator 29 through line 40 is supplied in an amount sufficient to transport the catalyst and to supply an amount of oxygen to the riser regenerator 29 in excess of that amount theoretrically required to burn all of the carbon on the spent catalyst to carbon dioxide. In this regeneration system, coke on the spent catalyst is substantially completely consumed to carbon dioxide and water vapor. Catalyst regeneration is carried out in the method and apparatus of this invention by contacting stripped spent catalyst withdrawn from the stripper at a temperature within the range of 1050° to 1250° F. with air in a single stage riser regenerator. In a typical installation, the catalyst residence time in the regenerator is within the range of 20 to 40 seconds and the catalyst density is in the range of 1.3 to 2.0 pounds per cubic foot with a superficial gas velocity in the range of 10 to 50 feet per second, preferably 10 to 15 feet per second.

Flue gases and entrained catalyst from riser regenerator 29 are discharged downwardly from the discharge line 41 into the vessel 6 wherein the catalyst falls to the lower part of separator vessel 6 and the flue gases are discharged through cyclone separator 52 located in regenerated catalyst separation vessel 6 with an inlet to the cyclone separator at substantially the same level in vessel 6 as the outlet from line 41 such that the flue gases flow horizontally away from the catalyst in vessel 6 with substantially no net vertical flow of flue gases.

Flue gases, comprising nitrogen, carbon dioxide and steam, and containing from 0 to 10 volume percent oxygen and less than 500 ppm, preferably less than about 200 ppm, carbon monoxide, are passed through cyclone 52 wherein finely divided entrained solid particles are recovered from the gas stream and returned by dipleg 54 to the catalyst bed 49. The cyclone 52, although represented as a single unit, may comprise an assembly of several cyclones arranged to effect substantially complete separation of entrained solid particles from the flue gas. The effluent gas mixture from cyclone 52 passes through line 57 into plenum 58 from which it is discharged through flue gas line 59. Valve 60 in line 59 controls the pressure in vessel 6 in response to differential pressure controller 61 to maintain the desired pressure in vessel 16.

Regenerated catalyst contained in vessel 6 is withdrawn from the bottom of the vessel through valve 8, previously described, to supply hot regenerated catalyst directly to dilute phase reaction zone 9.

In the process of this invention, hydrocarbon oil feed to the reaction zone 9 preferably is preheated to a temperature below its vaporization temperature. The oil feed may be at a temperature in the range of about 400° F. to about 700° F. provided the temperature of the feed hydrocarbon does not exceed that at which substantial thermal cracking begins to occur. Heat required to raise the temperature of the hydrocarbon feed in the reaction zone to the desired reaction temperature in the range of 900° to 1100° F., preferably 950° to 1050° F., is provided by the hot regenerated catalyst from separator vessel 6 which preferably is at a temperature in the range of from about 1250° F. to about 1450° F. The total pressure in the reaction zone section of the system is preferably in the range of 4 to 30 psig. Preferred reaction conditions are further illustrated in the following specific example of a preferred embodiment of the process of this invention.

EXAMPLE

An example of one specific embodiment of the present invention, as applied to the cracking of gas oil, illustrates its utility. In this example, a 23° API virgin gas oil containing 1.67% sulfur is preheated to a temperature of about 450° F. prior to introduction into the reaction zone at the rate of 35,000 barrels (42 gal/bbl) per day together with 1000 barrels (42 gal/bbl) per day of recycled gas oil. The catalyst employed in this example is a high activity, high alumina zeolite type cracking catalyst having moderate hydrogen transfer characteristics. The regenerated catalyst enters the top of the downflow reaction zone at the rate of 24.7 tons per minute and a temperature of about 1325° F. maintaining the reactor outlet temperature at 985° F. In this specific example, the reactor pressure is 25 pounds per square inch gauge. The downflow reactor is 60 inches in diameter and 40 feet in length. The catalyst residence time in the reactor is about 1.7 seconds. In this example, the catalyst velocity at the point of feed injection is 7 feet per second and the velocity of the reactants and reaction products at the outlet of the downflow reactor is about 30 feet per second.

Catalyst separated from the reactor effluent is stripped with steam in a first stripping zone having a catalyst residence time of about 20 seconds at a rate of about 1.2 pounds of steam per thousand pounds of catalyst. The steam stripped catalyst is mixed with hot regenerated catalyst at a rate of 23.3 tons (46,600 pounds) per minute increasing the temperature of the spent catalyst to about 1150° F. The mixture of spent and regenerated catalyst is fluidized and stripped in a second stripping zone having a catalyst residence time of about 30 seconds. The catalyst from the second stripping zone at a temperature of about 1150° F. is contacted with air at a rate of 308,000 pounds per hour. The riser regenerator has a length of 150 feet and a diameter of 13 feet. Catalyst residence time in the regenerator is about 20 seconds with a superficial gas velocity of about 10 feet per second. The average catalyst density in the riser regenerator is about 1.5 pounds per cubic foot.

Regenerated catalyst from the catalyst regenerator at a temperature of about 1325° F. is collected in separator vessel 6 and introduced into the reactor as above described.

It will be evident that the present invention makes use of gravity, rather than a carrier gas, to provide an evenly distributed flow of regenerated catalyst to the reaction zone. Hydrocarbon oil feedstock is injected into the downwardly flowing catalyst through a multiplicity of nozzles located circumferentially around the reaction zone. The several feed injection levels provided along the length of the reaction zone conduit result in extreme flexibility in operation by giving a choice of reaction conditions which may be employed as needed with changes in feedstocks and in product requirements.

Conversion of the hydrocarbon feedstock occurs in the reaction zone wherein the mixture of catalyst and hydrocarbon feed flow downward in progressive flow without backmixing of the catalyst in the reactants. The catalyst moves through the reactor under the influence of gravity at a rate equal to or faster than the rate of flow of oil vapors. The reaction zone terminates in a separator vessel having a relatively large cross-sectional area as compared with the cross-sectional area of the reactor, e.g. 20 to 30 times the reactor cross-sectional area. Spent catalyst is disengaged from the reaction products efficiently and effectively by gravity in combination with the downward momentum of the catalyst particles. Catalyst separation is so effective in the inertial ballistic separator that a single stage cyclone system will usually suffice to remove fine particles of catalyst from the product vapors.

Spent catalyst separated from the product vapors is collected in a catalyst stripper in the lower part of the spent catalyst separation vessel. In a preferred embodiment, the catalyst stripping is carried out in two stages. In the first stage, which occurs in the upper part of the catalyst stripper, a dense phase bed of spent catalyst is fluidized by and stripped with steam. The resulting mixture of steam and stripped hydrocarbon vapors passes upwardly from the stripper into the separator vessel and exits with product vapors through the product cyclones. The steam stripped spent catalyst is mixed with hot regenerated catalyst from the catalyst regenerator at an intermediate level in the catalyst stripper and the admixture of stripped spent catalyst and regenerated catalyst is fluidized with an inert gas in the lower portion of the catalyst stripper.

The catalyst mixture exits the second section of the stripper through a flow control valve into a transfer conduit where it is transported by air into a riser regenerator. Superficial vapor velocities in the riser regenerator are maintained at a relatively low value to ensure sufficient residence time in the riser regenerator for regeneration of the catalyst. Substantially complete combustion of coke from the catalyst takes place in the riser regenerator as the catalyst travels upward through the regenerator. Regenerated catalyst from the riser regenerator is discharged downwardly through a discharge line into a ballistic separator vessel wherein the regenerated catalyst is separated from flue gases. The cross-sectional area of the separator vessel may be 20 to 50 times the cross-sectional area of the discharge line.

Regenerated catalyst is collected in the lower part of the regenerated catalyst separator from which it flows by gravity through a flow control valve into the upper end of the reactor. The regenerated catalyst flow control valve adjusts the rate of flow of hot regenerated catalyst to the reactor as needed to maintain the desired reaction temperature in the downflow reaction zone.

Flue gases consisting of nitrogen, oxygen, water vapor, carbon dioxide, and small amounts of carbon monoxide, sulfur oxide and argon exit the regenerated catalyst separator through cyclones which serve to remove fine particles of catalyst from the flue gas. As in conventional systems, the flue gas passes through a suitable pressure reducer and heat recovery system before it is discharged into the atmosphere.

Good catalyst-oil mixing occurs at the top of the reaction zone. Since the catalyst is accelerated by gravity, it is moving in the same direction as the oil at time of initial contact between the oil feed and the catalyst so that mixing is intimate and rapid, and no energy is dissipated in reversing the direction of catalyst flow. Undersirable backmixing does not occur within the reactor.

The short-contact time allowed in the downflow reaction zone allows high reaction temperatures necessary to produce high octane cracked gasoline. Contact time may be adjusted by introducing the feed into the downflowing reaction zone at any of several alternate injection points. This provides a new degree of freedom in fluid catalytic cracking.

The catalyst-oil vapor separation in the ballistic spent catalyst separator stops the reaction and eliminates detrimental production of diolefins and coke, thereby contributing to high yields of desired products and to desirable product qualities. A short reactor vapor line aids in minimizing unwanted thermal cracking of reaction products. Some coke will decompose in the high temperature second stage of catalyst stripping. This results in a low coke yield with reduced hydrogen content. Additionally, some of the sulfur containing compounds in the coke decompose in the high temperature stripper thereby reducing sulfur oxide emissions with the regenerator flue gas.

Catalyst activity is a function of catalyst inventory, particularly in the regenerator. The riser-regenerator of this invention has the lowest possible inventory—much lower than that of a conventional dense phase fluid bed regenerator or a two-stage regenerator. Coupled with ballistic catalyst-flue gas separation, the regeneration zone of the system results in heretofore unmatched catalyst utilization. Catalyst attrition is reduced because high velocity air jets are not used to burn coke in a fluidized bed. Since air, rather than steam, is used to circulate catalyst during start up, or other feed out of unit conditions, the catalyst deactivation normally associated with these conditions does not occur.

Since gas and coke yields are lower than those in conventional units, gas compressor and air blower horsepower requirements are lower. The downwardly directed reaction zone requires no catalyst lift or dispersion steam, and the ballistic separator eliminates the need for anti-coking steam. Two-stage high-temperature stripping minimizes catalyst stripping steam requirements, and since the catalyst entering the riser regenerator is preheated, excess air requirements for complete combustion regeneration are reduced.

Reduced investment cost relative to other fluid catalytic cracking systems is a result of system simplicity and reduced vessel sizes. The ballistic catalyst separation eliminates the need for rough cut cyclones such as are commonly employed in contemporary units. Riser-regeneration eliminates the need for complex regenerator air distribution systems with their high maintenance requirements. Lower investment costs will result from elimination of the need for a feed riser emergency and start-up steam system and minimization of catalyst storage hopper requirements because of reduced operating inventory.

Flexibility is maximized both for changes in conversion and feed type, and also for changes in feed rate since the reaction zone catalyst flow is downward and even at zero oil flow there is still no possibility of catalyst slumping, a possibility that exists in every unit with a riser-reactor. As stated previously, reaction residence time may be changed independently of feedrate and other operating variables. Complete combustion regeneration is carried out at constant air rate so the riser regenerator always operates at optimum velocities. The enhanced flexibility translates into a unit ideally suited for cracking "heavy" feedstocks. The low coke producing characteristics of this unit, together with the possibility of very short contact times, allows this unit to be practically adjusted to process a wide variety of feedstocks at many different levels of conversion and severity.

We claim:

1. In a fluidized catalytic hydrocarbon cracking process wherein hydrocarbon conversion is carried out in a downflow transport type reaction zone in the presence of hot freshly regenerated catalyst, spent catalyst from said reaction zone is separated from reaction products and stripped of volatile hydrocarbons in a fluidized bed catalyst stripping zone, stripped catalyst is regenerated with an oxygen-containing gas in a catalyst regeneration zone, and hot freshly regenerated fluid catalytic cracking catalyst from the regeneration zone is supplied by gravity in the absence of a carrier fluid into the upper end of a vertical transport downflow reaction zone of relatively small cross-sectional area as compared with its length the improvement which comprises discharging reaction products and catalyst from said reaction zone axially downward directly into the upper portion of an unobstructed ballistic separation zone having a cross-sectional area within the range of 20 to 30 times the cross-sectional area of said reaction zone and open at its lower end to said stripping zone thereby permitting unobstructed free fall of catalyst under the influence of gravity from said reaction zone through said separation zone directly into said stripping zone, introducing hydrocarbon feedstock into said reaction zone along the path of flow of said catalyst forming a mixture consisting of regenerated cracking catalyst and hydrocarbon feedstock vapors at an elevated temperature in the range of 900° F. to 1100° F., maintaining contact between catalyst and hydrocarbon reactants in said reaction zone for an average contact time in the range of 0.5 to 5 seconds, maintaining a fluidized bed level in said stripping zone well below the discharge end of said reaction zone, and effecting substantially complete separation of spent catalyst from hydrocarbon conversion products in said separation zone solely by particle inertia and gravity, withdrawing hydrocarbon conversion products separated from said catalyst in said separation zone at substantially the level of discharge from said reaction zone such that said products are drawn horizontally outward away from the downwardly moving catalyst particles in said separation zone, and collecting separated catalyst from said ballistic separation zone in a fluidized bed in said stripping zone.

2. A process according to claim 1 wherein said separated spent catalyst from said spent catalyst separation zone is stripped with stripping medium at a temperature in the range of 900° F. to 1250° F.

3. A process according to claim 2 wherein stripped catalyst from said stripping zone is supplied to a dilute phase riser regeneration zone wherein regeneration air is supplied to the lower portion of said riser regeneration zone at a rate sufficient to carry said catalyst particles upwardly therethrough and in an amount sufficient to provide an excess of oxygen over that required for complete combustion of coke from said catalyst to carbon dioxide.

4. A process according to claim 3 wherein hot regenerated catalyst at a temperature in the range of 1250° to 1450° F. from said riser regenerator is discharged axially downwardly into a vertical cylindrical enlarged regenerated catalyst separation zone wherein catalyst is separated from resulting flue gases.

5. A process as defined in claim 1 wherein said flue gases from said riser regenerator are withdrawn from said regenerated catalyst separation zone at substantially the same level as the discharge from said riser regeneration zone such that said flue gases flow horizontally outward away from the downwardly moving solid catalyst particles with substantially no net vertical flow of flue gases in the separation zone effecting relatively efficient separation of catalyst from flue gases.

* * * * *